US012797289B2

(12) United States Patent
Pollak et al.

(10) Patent No.: US 12,797,289 B2
(45) Date of Patent: Nov. 17, 2026

(54) PULSE DEVICE

(71) Applicant: Pulse Devices LLC, Old Lyme, CT (US)

(72) Inventors: Ethan Pollak, Salt Lake City, UT (US); Cole Krensky, Salt Lake City, UT (US)

( * ) Notice: Subject to any disclaimer, the term of this patent is extended or adjusted under 35 U.S.C. 154(b) by 427 days.

(21) Appl. No.: 18/429,419

(22) Filed: Jan. 31, 2024

(65) Prior Publication Data

US 2024/0197562 A1 Jun. 20, 2024

Related U.S. Application Data

(63) Continuation-in-part of application No. 18/389,725, filed on Dec. 19, 2023, now abandoned.

(60) Provisional application No. 63/433,524, filed on Dec. 19, 2022.

(51) Int. Cl.
*A61H 23/02* (2006.01)
*A61H 23/00* (2006.01)

(52) U.S. Cl.
CPC ... *A61H 23/0263* (2013.01); *A61H 2023/002* (2013.01); *A61H 2201/0188* (2013.01); *A61H 2201/1215* (2013.01); *A61H 2201/165* (2013.01)

(58) Field of Classification Search
CPC .............. A61H 2201/165; A61H 23/02; A61H 2201/5043; A61H 2201/0157; A61H 2201/5002; A61H 2023/002; A61H 2201/0207; A61H 2201/1215; A61H 2201/1635; A61H 2201/5025; A61H 2201/5035; A61H 2201/5058; A61H 2201/5084; A61H 2201/5097; A61H 2205/06; A61H 2205/062; A61H 23/0263; A61H 2201/0188; A61B 2562/0219
See application file for complete search history.

(56) References Cited

U.S. PATENT DOCUMENTS 10,695,262 B2 * 6/2020 Brown .............. A61F 13/00051
2019/0110949 A1 * 4/2019 Bhatti ................ A61H 23/0263

FOREIGN PATENT DOCUMENTS

JP 2022043295 A * 3/2022 ............. A61B 5/395

* cited by examiner

*Primary Examiner* — Madison Matthews
(74) *Attorney, Agent, or Firm* — Intellectual Strategies

(57) ABSTRACT

A fitness device for mechanical vibration of a muscle includes a wearable housing, and a vibration generator contained inside the wearable housing. The vibration generator generates a pulsed vibration or constant vibration and the pulsed or constant vibration is configured to be delivered to a muscle of the user. The fitness device further includes a battery coupled to the vibration generator and an adhesive pad attached to an outer surface of the bottom of the wearable housing. The adhesive pad removably attaches the wearable housing to the user.

20 Claims, 8 Drawing Sheets

PULSE DEVICE

CROSS-REFERENCE TO RELATED APPLICATIONS

This application is a continuation-in-part of U.S. application Ser. No. 18/222,222, filed on Dec. 19, 2023 which claims the benefit of U.S. Provisional Application No. 63/433,524, filed on Dec. 19, 2022. Each of these references is incorporated by reference herein in their entirety.

FIELD

This disclosure relates generally to a wearable fitness device or fitness recovery device. More specifically, this disclosure relates to a wearable fitness device or fitness recovery device with a pulsed or constant vibration.

BACKGROUND

When most people lift weights, they go through the motions of the exercise but do not focus on the specific muscles they are targeting. By simply going through the motions, lifters often times don't get the results they want because their workouts are ineffective. One of the main reasons their workouts are ineffective can be because they are engaging secondary muscles and joints that they didn't intend to focus on, which can sometimes lead to over-exhaustion or injury. Additionally, poor activation is a major reason that people are having ineffective workouts. Current solutions use electrical muscle stimulation (EMS) or high frequency or high amplitude vibrations. EMS engages muscles and induces muscle contraction via electrical stimulation and lacks the capacity to enhance the mind muscle connection. EMS involuntarily engages muscles en masse, rather than voluntarily engaging only the intended muscle(s) or fiber(s). Devices that use high frequency or high amplitude vibrations will trigger strong tonic vibration reflex or involuntary reflex of the muscles. Embodiments herein may also trigger the tonic vibration reflex as well but on a smaller level.

Embodiments of the invention described herein allow for many benefits to physiological mechanisms. Some of the mechanisms are listed for the benefit but is not an exhaustive list. These mechanisms may include but are not limited to: a tonic vibratory reflex mechanism; an increase in corticospinal excitability; a reduction in reciprocal inhibition; an increase in muscle temperature; and increased attentional focus (mind-muscle connection). Some of these benefits are discussed further herein.

SUMMARY

Disclosed herein is a fitness device for mechanical vibration of a muscle. The fitness device includes a wearable housing, and a vibration generator contained inside the wearable housing. The vibration generator generates a pulsed vibration and the pulsed or constant vibration is configured to be delivered to a muscle of the user. The fitness device further includes a battery coupled to the vibration generator and an adhesive pad attached to an outer surface of the bottom of the wearable housing. The adhesive pad removably attaches the wearable housing to the user. The preceding subject matter of this paragraph characterizes example 1 of the present disclosure.

The vibration generator is an eccentric rotating mass motor. The preceding subject matter of this paragraph characterizes example 2 of the present disclosure, wherein example 2 also includes the subject matter according to example 1, above.

The fitness device further comprises a communication port. The preceding subject matter of this paragraph characterizes example 3 of the present disclosure, wherein example 3 also includes the subject matter according to any one of examples 1-2, above.

The fitness device further comprises an LED indicator on an outside of the wearable housing. The preceding subject matter of this paragraph characterizes example 4 of the present disclosure, wherein example 4 also includes the subject matter according to any one of examples 1-3, above.

The fitness device further comprises a vibration device controller, and wherein the vibration device controller comprises memory, data storage, and a data processor configured to operate the vibration generator. The preceding subject matter of this paragraph characterizes example 5 of the present disclosure, wherein example 5 also includes the subject matter according to any one of examples 1-4, above.

The pulsed vibration comprises a frequency between 1 Hz and 120 Hz. The preceding subject matter of this paragraph characterizes example 6 of the present disclosure, wherein example 6 also includes the subject matter according to any one of examples 1-5, above.

The pulsed vibration comprises a frequency between 10 Hz and 28 Hz. The preceding subject matter of this paragraph characterizes example 7 of the present disclosure, wherein example 7 also includes the subject matter according to any one of examples 1-6, above.

The fitness device further comprises an active stage and a passive stage, wherein the active stage comprises a state where vibrations are generated, and wherein the passive stage comprises a state where vibrations are not generated or generated at a lower amplitude or frequency. The preceding subject matter of this paragraph characterizes example 8 of the present disclosure, wherein example 8 also includes the subject matter according to any one of examples 1-7, above.

A transition from active to passive stages comprises a gradual decrease in an amplitude of the vibrations. The preceding subject matter of this paragraph characterizes example 9 of the present disclosure, wherein example 9 also includes the subject matter according to any one of examples 1-8, above.

A transition from active to passive stages comprises an abrupt decrease in an amplitude of the vibrations. The preceding subject matter of this paragraph characterizes example 10 of the present disclosure, wherein example 10 also includes the subject matter according to any one of examples 1-9, above.

The low-frequency vibration generator mechanically generates the pulsed vibration. The preceding subject matter of this paragraph characterizes example 11 of the present disclosure, wherein example 11 also includes the subject matter according to any one of examples 1-10, above.

Disclosed herein is a fitness device for mechanical vibration of a muscle. The fitness device includes a wearable housing having a top, bottom, an outside and an inside. The fitness device includes a vibration generator contained inside the wearable housing, wherein the vibration generator generates a pulsed vibration, wherein the pulsed vibration is delivered to a muscle of the user. The fitness device includes a battery connected to the vibration generator. The fitness device includes an adhesive pad attached to an outer surface of the bottom of the wearable housing, wherein the adhesive pad removably attaches the wearable housing to the user.

The preceding subject matter of this paragraph characterizes example 12 of the present disclosure.

The vibration generator is an eccentric rotating mass motor. The preceding subject matter of this paragraph characterizes example 13 of the present disclosure, wherein example 13 also includes the subject matter according to example 12, above.

The low-frequency vibration generator mechanically generates the pulsed vibration. The preceding subject matter of this paragraph characterizes example 14 of the present disclosure, wherein example 14 also includes the subject matter according to any one of examples 12-13, above.

The fitness device further comprises a communication port. The preceding subject matter of this paragraph characterizes example 15 of the present disclosure, wherein example 15 also includes the subject matter according to any one of examples 12-14, above.

The fitness device further comprises an LED indicator on an outside of the wearable housing. The preceding subject matter of this paragraph characterizes example 16 of the present disclosure, wherein example 16 also includes the subject matter according to any one of examples 12-15, above.

The fitness device further comprises a vibration device controller, and wherein the vibration device controller comprises memory, data storage, and a data processor configured to operate the vibration generator. The preceding subject matter of this paragraph characterizes example 17 of the present disclosure, wherein example 17 also includes the subject matter according to any one of examples 12-16, above.

The pulsed vibration comprises a frequency between 5 Hz and 35 Hz. The preceding subject matter of this paragraph characterizes example 18 of the present disclosure, wherein example 18 also includes the subject matter according to any one of examples 12-17, above.

The fitness device further comprises an active stage and a passive stage, wherein the active stage comprises a state where vibrations are generated, and wherein the passive stage comprises a state where vibrations are not generated or generated at a lower amplitude or frequency. The preceding subject matter of this paragraph characterizes example 19 of the present disclosure, wherein example 19 also includes the subject matter according to any one of examples 12-18, above.

A transition from active to passive stages comprises a gradual decrease in an amplitude of the vibrations. The preceding subject matter of this paragraph characterizes example 20 of the present disclosure, wherein example 20 also includes the subject matter according to any one of examples 12-19, above.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered limiting of its scope, the subject matter will be described and explained with additional specificity and detail through the use of the drawings.

Throughout the description, similar reference numbers may be used to identify similar elements.

DETAILED DESCRIPTION

Figure 1:
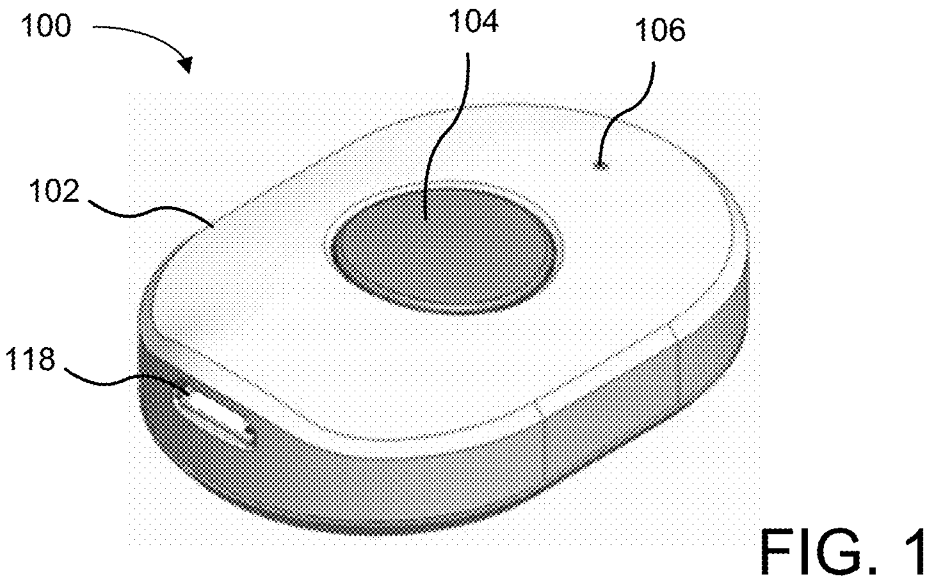
FIG. 1 depicts one embodiment of a pulse device or a wearable fitness device according to one or more embodiments of the present disclosure.
Figure 2:
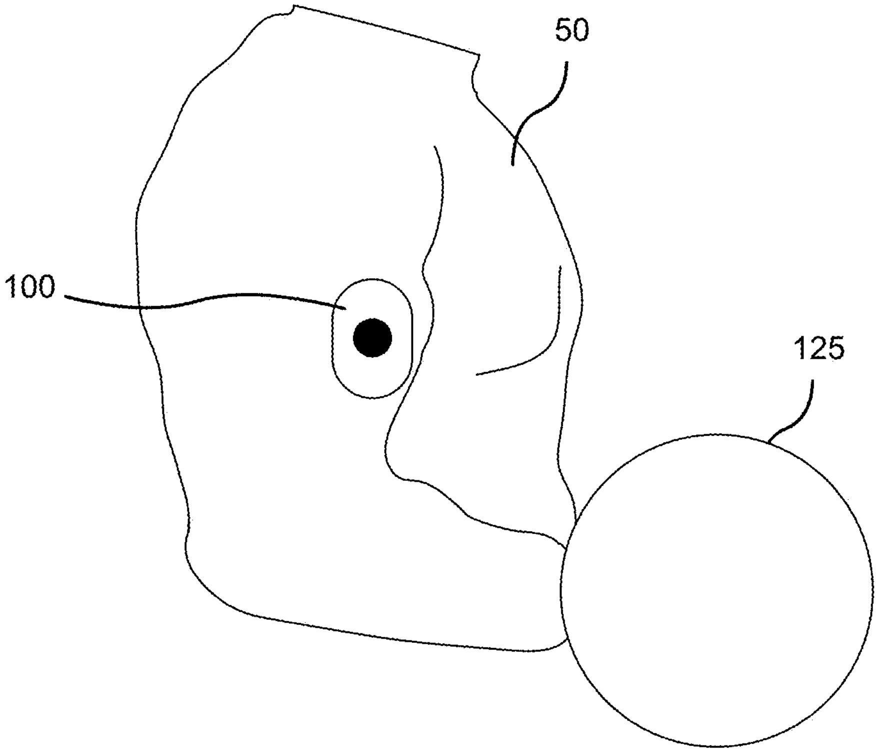
FIG. 2 depicts the pulse device of FIG. 1 in use during a workout according to one or more embodiments of the present disclosure.
Figure 3:
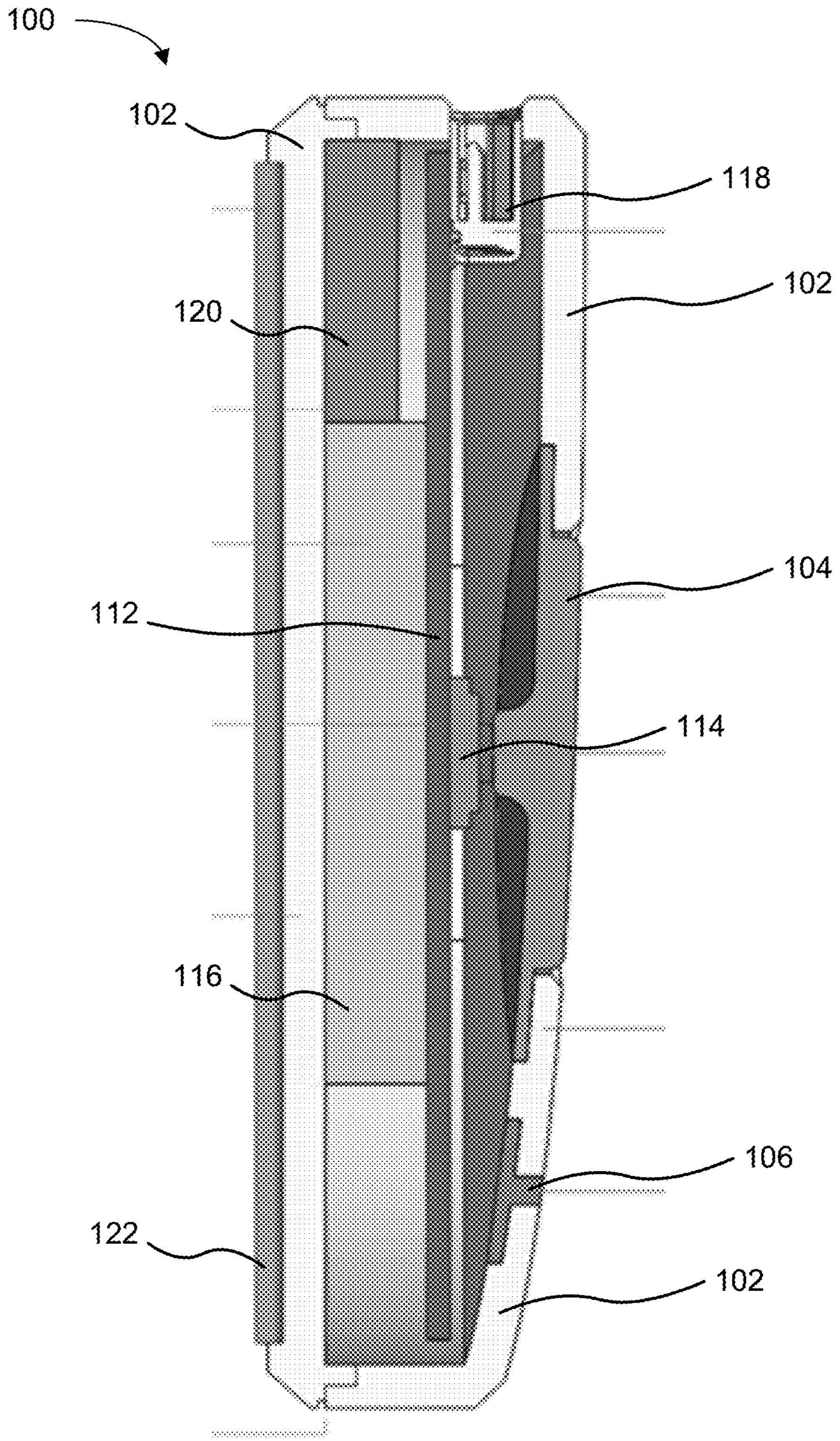
FIG. 3 depicts a cross-sectional view of one embodiment of internal components of the pulse device of FIG. 1 according to one or more embodiments of the present disclosure.
Figure 4:
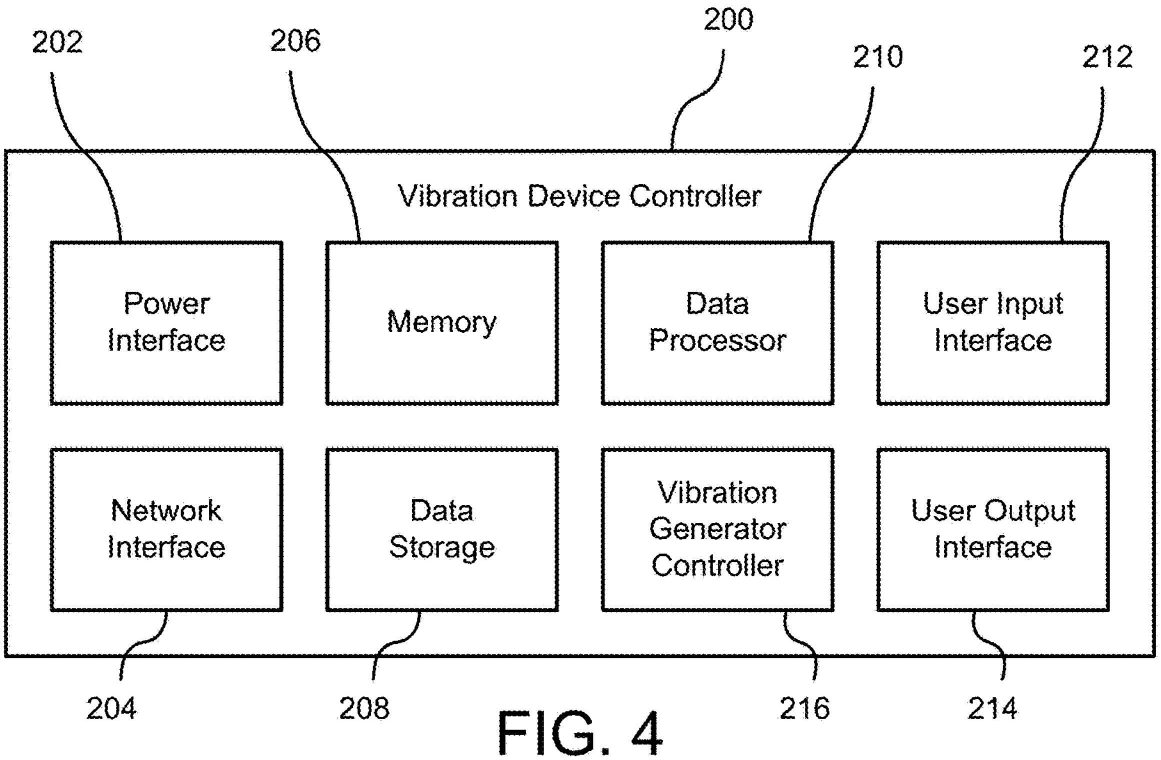
FIG. 4 depicts a block diagram of one embodiment of a vibration device controller according to one or more embodiments of the present disclosure.
Figure 5:
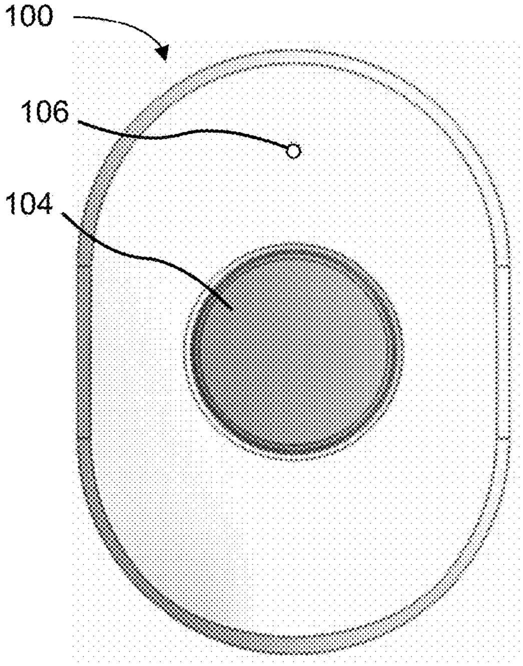
FIG. 5 depicts a top view of the pulse device of FIG. 1 according to one or more embodiments of the present disclosure.
Figure 6:
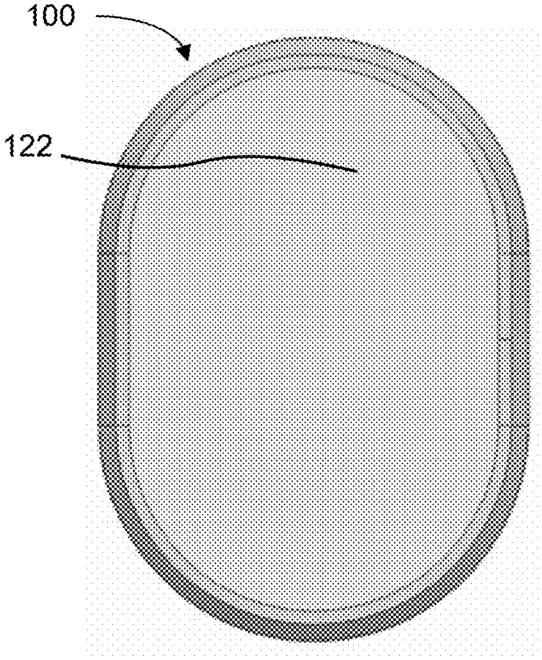
FIG. 6 depicts a bottom view of the pulse device of FIG. 1 according to one or more embodiments of the present disclosure.
Figure 8:
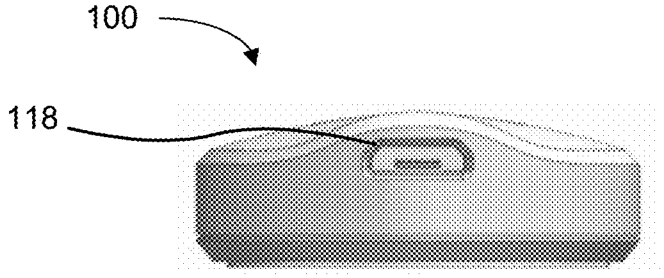
FIG. 8 depicts an end view of the pulse device of FIG. 1 according to one or more embodiments of the present disclosure.
Figure 7:
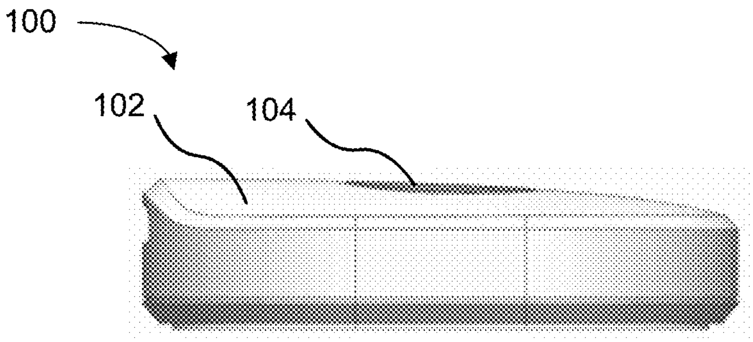
FIG. 7 depicts a side view of the pulse device of FIG. 1 according to one or more embodiments of the present disclosure.
Figure 9:
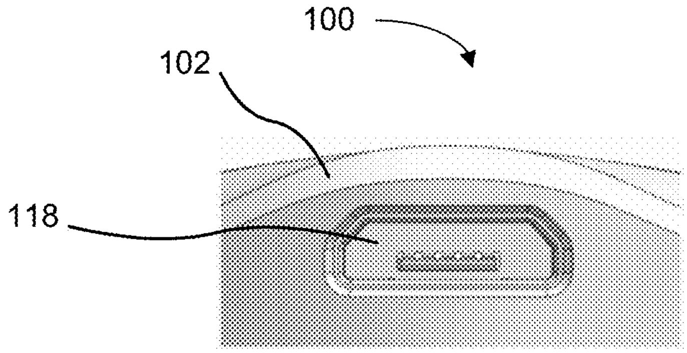
FIG. 9 depicts a more detailed view of the embodiment in FIG. 8 according to one or more embodiments of the present disclosure.
Figure 10:
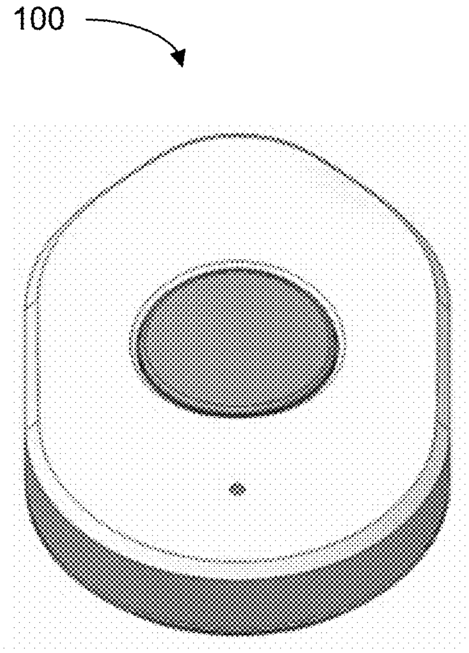
FIG. 10 depicts a top isometric view of the pulse device of FIG. 1 according to one or more embodiments of the present disclosure.
Figure 11:
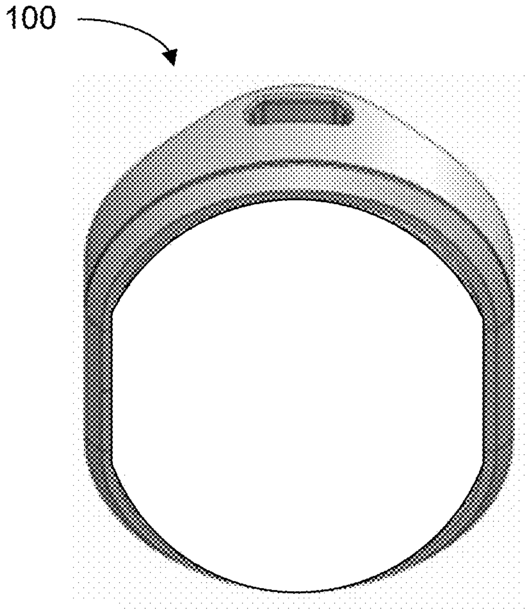
FIG. 11 depicts a bottom isometric view of the pulse device of FIG. 1 according to one or more embodiments of the present disclosure.
Figure 12:
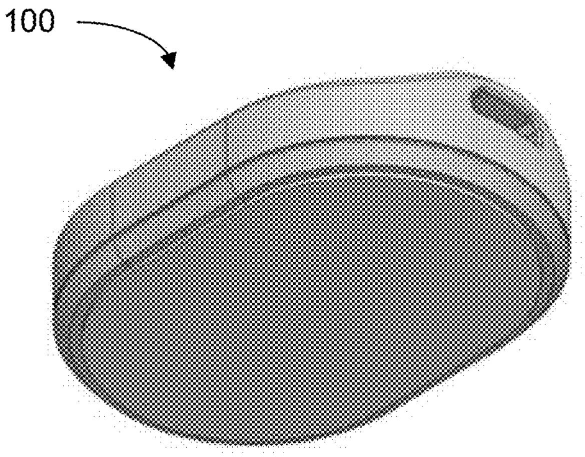
FIG. 12 depicts a bottom perspective view of the pulse device of FIG. 1 according to one or more embodiments of the present disclosure.
Figure 13:
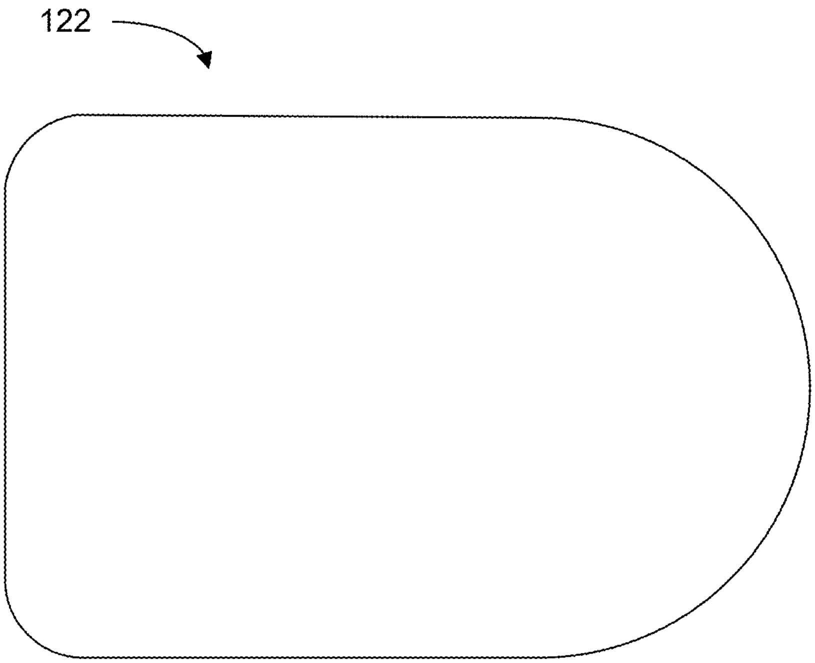
FIG. 13 is a top view of one embodiment of an adhesive pad for a pulse device according to one or more embodiments of the present disclosure.
Figure 14:
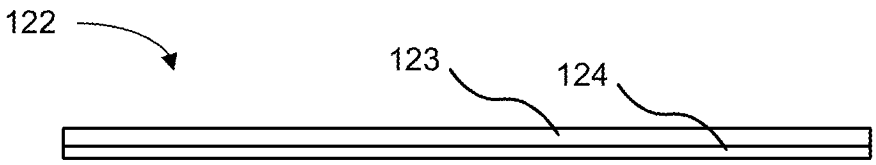
FIG. 14 is a cross-sectional view of the adhesive pad of FIG. 13 according to one or more embodiments of the present disclosure.
Figure 15:
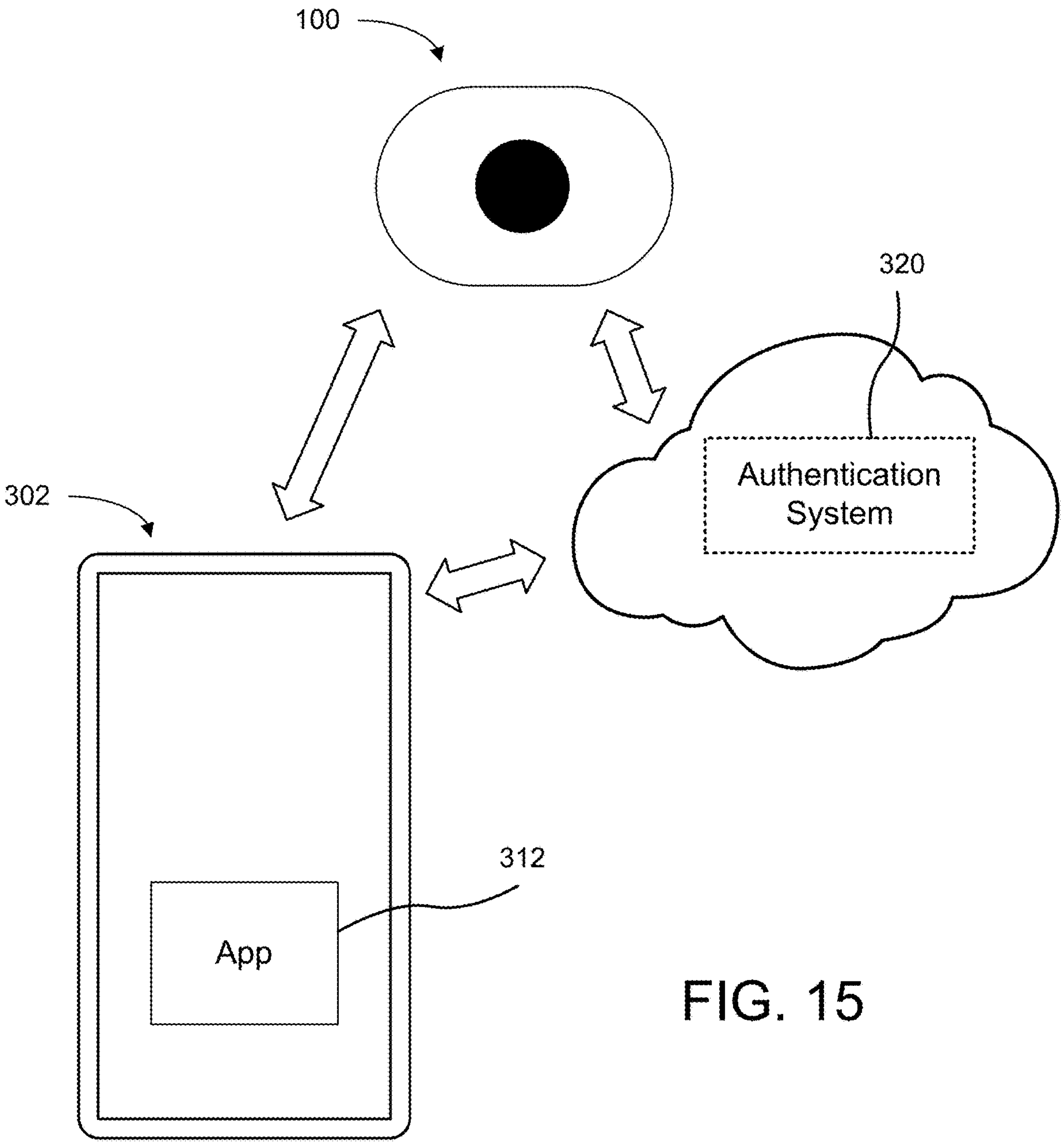
FIG. 15 depicts one embodiment of a pulse device system according to one or more embodiments of the present disclosure.
Figure 16:
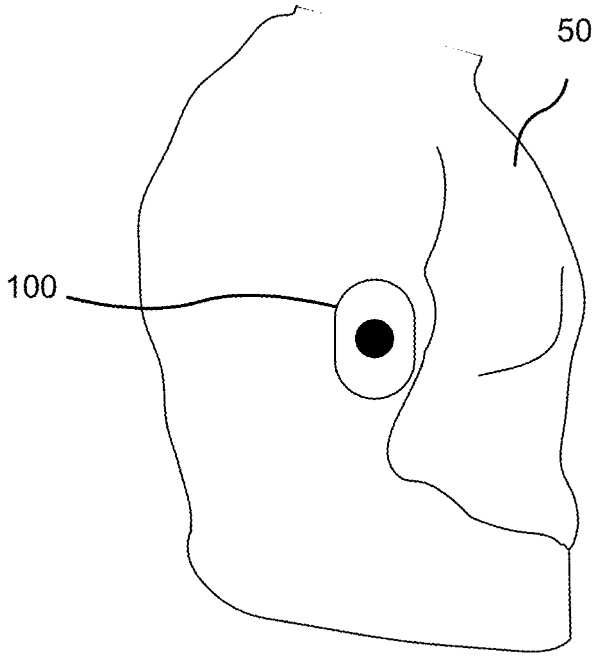
FIG. 16 depicts a fitness recovery device in use for recovery according to one or more embodiments of the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Embodiments described herein provide various improvements and benefits over existing solutions. Some embodiments allow for improved blood circulation and associated benefits therefrom. Some embodiments allow for a decrease in recovery time for a user. The device allows for the muscle recovery to be sped up. Some embodiments help improve mobility in the user. Some embodiments increase a range of motion of a user. Some embodiments help to increase flexibility of the user. Embodiments described herein help a user have deeper and more effective stretches. Some embodiments also help with increased strength and/or increased force generation. Some embodiments help with increased muscle excitement at rest, increased long and short term physical function, and decreased muscle spasticity. Some embodiments help with increased muscle temperature and/or increased jump height.

FIG. 1 depicts one embodiment of a pulse device 100 which also might be referred to as a wearable fitness device or may be referred to as a recovery device. While many embodiments of a pulse device (or wearable fitness device) are described herein, at least some of the described embodiments enable a bridging of the gap between a user's brain and muscles during exercise movements. Additionally, muscle activation is increased with many embodiments. At least some of the described embodiments deliver interval vibrations (or a pulse) to a targeted muscle or muscle group that mimic muscle tapping. The device can be used during training but may also be used in connection with recovery after a workout or for soreness, tension, or minor pain relief.

In some embodiments, the interval vibrations have at least two stages—(1) an active stage and (2) a passive stage. Each of the active and passage stages has unique vibrational characteristics.

In some embodiments, the active and passive stages are essentially ON and OFF modes in which vibrations are generated during the ON mode and are not generated during the OFF mode.

In other embodiments, each of the active and passage stages may have a unique combination of operating parameters including, but not limited to, frequency, amplitude, duration, and so forth. This physical vibrational mimicry continually draws the brain's attention back to the muscle receiving the interval vibrations and, in this way, enhances the mind muscle connection. Enhancement of the mind muscle connection improves the efficiency of workouts, generally, and decreases the risk of injury to the user. Some embodiments have constant vibrations for some muscles as opposed to pulsing vibrations.

Embodiments of the invention described herein allow for many benefits to physiological mechanisms. Some of the mechanisms are listed for the benefit but is not an exhaustive list. These mechanisms may include but are not limited to: a tonic vibratory reflex mechanism; an increase in corticospinal excitability; a reduction in reciprocal inhibition; an increase in muscle temperature; and increased attentional focus (mind-muscle connection). Each of these is discussed in more detail.

Tonic vibratory reflex is a first benefit. When vibration is applied to the muscle belly or its tendon, it elicits a reflex muscle contraction that has the potential to increase muscle function. Studies performed on the muscle-tendon site have reported a strong proprioceptive stimulus that may elicit the primary somatosensory and motor cortices and influences the primary afferent firing rate. This mechanism is stimulated by a sequence of rapid muscle stretching that occurs when applying vibration, triggering muscle spindles and thereby causing an involuntary production of muscle force. This neurophysiological mechanism could be hypothesised to be greatest in slow twitch muscles due to their greater density of muscle spindles. This may be a potential reason why there are intra- and inter individual differences in the effectiveness of LV (and pulse) both between muscle groups (some muscles are faster than others) and between individual (Endurance vs Power).

The tonic vibratory reflex can be triggered by vibration frequencies ranging from 20 to 200 Hz, and its intensity is proportional to the vibration frequency. The most effective protocol at activating muscle spindle fibers comprises of the mechanical vibration of individual muscles with a range of 0.2-1 mm with sinusoidal sequences with a frequency of 100 Hz. The primary endings of muscle spindles are stimulated with a one-to-one discharge rate up to 100 Hz, and some studies have suggested that a 30-50 Hz frequency is appropriate. This is identical to the discharge rate of motor units during maximal effort.

A second benefit is increased corticospinal and motor neuron excitability. This increase in force production during submaximal contractions can be attributed to an increase in corticospinal excitability (the strength of the response of cortical neurons to a given stimulation, reflects neuron reactivity) and has been demonstrated in both upper and lower limbs by an increase in motor evoked potential and lower resting motor threshold. This excitability seems to occur at different frequencies between muscle groups depending on muscle spindle density although this relationship seems to be inverted u shaped with too low or too high a frequency being sub-optimal. Too low a frequency provides insufficient temporal summation of Ia afferent discharge to lead to a change in corticospinal excitability and too high is an overstimulation of Ia afferents. The sweet-spot for most muscles based on optimal firing rate of Ia afferents seems to be between 50-110 Hz. This increase in excitability seems to present whether the vibration is applied during contraction or at rest. Pulse therefore could be used as a priming exercise before performance.

A third benefit is reciprocal inhibition. Another potential reason for the improvement in muscle force is the reduction in excitability of the muscles that are opposing the movement (antagonists) and a longer cortical silent period in antagonist muscles. Muscle opposing the movements are turned off for longer. This is known as reciprocal inhibition and is a noticeable reason why we see an increase in strength early in training programs when muscles become better coordinated to produce movements.

A fourth benefit is increase in muscle temperature. There has been a number of reports of increases in muscle temperature especially with WBV training attributing an increase of 0.3 °C. per minute of use, this is roughly double that of cycling (0.15 °C. per minute) and a hot bath (0.090 °C. per min). This was conducted using a Galileo machine (6 mm amplitude, 26 Hz Frequency) in the squatting position. This increase in muscle temperature can increase muscle force and contractility with increases in performance (2-5%) with every 1 degree increase in muscle temperature. That said it is unlikely with the amplitudes achieved with local vibration devices that this plays a role.

A fifth benefit is mind-muscle connection or attentional focus. Mind-muscle connection is a psychological aspect of training in which you focus on feeling each and every rep and recruiting specific muscles. It is about more than just going through the motions of each movement, but rather, focusing on a conscious and deliberate muscular contraction. This may be particularly useful during rehabilitation in helping to retrain coordination patterns. Attentional focus can be operationally defined as what an individual thinks about when carrying out a given movement or activity. There are two basic attentional focus strategies during performance of a task: internal and external. An internal focus involves thinking about a given bodily movement during performance while an external focus (i.e. pulse/LV) involves shifting performance-oriented concentration to the environment. In particular, this external focus has been demonstrated to show greater motor learning benefits. From a training perspective, caution needs to be applied to avoid imbalances through focus on a particular group over other agonist or synergist muscles. This attentional focus effect may also be achieved through verbal feedback (i.e., through a trainer) and potentially could mean that the device could be used to time sets and repetitions to elicit this response.

Although the system is shown and described with certain components and functionality, other embodiments of the system may include fewer or more components to implement less or more functionality. At least some of the described embodiments include a wearable fitness device that contains a vibration generator. The vibrations are generated in intervals, referred to as interval vibrations above. An interval vibration has at least two stages—an active stage, where high amplitude vibrations are generated; and, a passive stage, where low amplitude vibrations are generated. The repetitive nature of the interval vibration, and the encompassed stages, continually draws the user's attention back to the targeted muscle or muscle groups. Such repetitive retargeting of the user's attention establishes and strengthens the mind muscle connection and increases the efficiency of the user's workouts. Similarly, the repetitive retargeting and strengthening of the mind muscle connection avoids over-exhaustion or injury. In some embodiments, the vibrations are constant. Constant vibrations may be used to establish connections as described above.

The vibrations generated can be low-frequency or high-frequency vibrations. Low-frequency vibrations are used when trying to avoid strong tonic vibration reflex. The wearable fitness device can be adhered to a user via an adhesive pad attached to the wearable fitness device. The wearable fitness device can be adhered to any portion of the user's body to target any desired muscle or muscle group. The low-frequency vibration is mechanically generated and is not an electric stimulation. The low-frequency vibration is between 5-35 Hz, more specifically 10-28 Hz. The 10-28 Hz frequency allows the wearable fitness device 100 to focus on performance instead of recovery, as it assists the user with muscle contractions as opposed to forcing the muscles to contract. In some embodiments, the vibration frequency is between 1-120 Hz, 1-120 Hz may be used during fitness applications. 30-120 Hz may be used for recovery applications. In some embodiments, the vibration frequency may be up to 200 Hz. The low-frequency vibration may trigger tonic vibration reflex (involuntary reflex) at low frequencies and increases engagement of the Golgi tendon organ as well as muscle spindles. These are components of the muscle that are responsible for the brain's sense of the muscle, which is also referred to as "proprioception."

What is claimed is:

1. A fitness device for mechanical vibration of a muscle during workouts or for recovery, the fitness device comprising:

a wearable housing, the wearable housing forming an internal cavity;

a vibration generator contained inside the wearable housing within the internal cavity, wherein the vibration generator generates a pulsed or constant physical vibration that causes the wearable housing to physically vibrate, and wherein the pulsed or constant physical vibration is configured to be mechanically delivered to the muscle of a user to physically vibrate the muscle of the user, wherein the physical vibration of the muscle of the user occurs during a contraction of the muscle during or within a specified time in lifting of weights;

a battery coupled to the vibration generator; and an adhesive pad attached to an outer surface of a bottom of the wearable housing, wherein the adhesive pad removably attaches the wearable housing to the user at a location of the muscle of the user, wherein the pulsed or constant physical vibration of the vibration generator is configured to be mechanically delivered to the muscle of the user via the wearable housing and the adhesive pad coupled at the location of the muscle of the user, and wherein the pulsed or constant physical vibration is configured to create a mind-muscle connection in conjunction with a workout.

2. The fitness device of claim 1, wherein the vibration generator is an eccentric rotating mass motor.

3. The fitness device of claim 2, wherein the fitness device further comprises a communication port.

4. The fitness device of claim 3, wherein the fitness device further comprises an LED indicator on an outside of the wearable housing.

5. The fitness device of claim 4, wherein the fitness device further comprises a vibration device controller, and wherein the vibration device controller comprises memory, data storage, and a data processor configured to operate the vibration generator.

6. The fitness device of claim 5, wherein the pulsed vibration comprises a frequency between 1 Hz and 120 Hz.

7. The fitness device of claim 5, wherein the pulsed vibration comprises a frequency between 10 Hz and 28 Hz.

8. The fitness device of claim 5, wherein the fitness device further comprises an active stage and a passive stage, wherein the active stage comprises a state where vibrations are generated, and wherein the passive stage comprises a state where vibrations are generated at a lower amplitude or frequency.

9. The fitness device of claim 8, wherein a transition from active to passive stages comprises a decrease in an amplitude of the vibrations.

10. The fitness device of claim 8, wherein a transition from active to passive stages comprises an elimination in an amplitude of the vibrations.

11. The fitness device of claim 1, wherein the low-frequency vibration generator mechanically generates the pulsed vibration.

12. A fitness device for mechanical vibration of a muscle during workouts or for recovery, the fitness device comprising:

a wearable housing having a top, bottom, an outside and an inside, the wearable housing forming an internal cavity;

a vibration generator contained inside the wearable housing, wherein the vibration generator generates a pulsed physical vibration that causes the wearable housing to physically vibrate, wherein the pulsed physical vibration is delivered to the muscle of a user through the physical vibration of the wearable housing during or after a workout;

a battery connected to the vibration generator; and straps to attach the wearable housing to the user with a bottom of the wearable housing contacting the user, and wherein the pulsed physical vibration of the vibration generator is configured to be mechanically delivered to the muscle of the user via the wearable housing coupled at the location of the muscle of the user, and wherein the pulsed physical vibration is configured to create a mind-muscle connection in conjunction with a workout.

13. The fitness device of claim 12, wherein the vibration generator is an eccentric rotating mass motor.

14. The fitness device of claim 13, wherein the vibration generator mechanically generates the pulsed vibration.

15. The fitness device of claim 14, wherein the fitness device further comprises a communication port.

16. The fitness device of claim 15, wherein the fitness device further comprises an LED indicator on the outside of the wearable housing.

17. The fitness device of claim 16, wherein the fitness device further comprises a vibration device controller, and wherein the vibration device controller comprises memory, data storage, and a data processor configured to operate the vibration generator.

18. The fitness device of claim 17, wherein the pulsed vibration comprises a frequency between 1 Hz and 120 Hz.

19. The fitness device of claim 12, wherein the fitness device further comprises an active stage and a passive stage, wherein the active stage comprises a state where vibrations are generated, and wherein the passive stage comprises a state where vibrations are not generated.

20. The fitness device of claim 19, wherein a transition from active to passive stages comprises a decrease in an amplitude of the vibrations.

* * * * *